(12) United States Patent
Damin

(10) Patent No.: US 10,976,569 B2
(45) Date of Patent: Apr. 13, 2021

(54) DEVICE FOR ATTACHING COMPONENT PARTS OF SPECTACLES FRAMES AND SPECTACLES COMPRISING SAID ATTACHMENT DEVICE

(71) Applicant: SAFILO SOCIETÀ AZIONARIA FABBRICA ITALIANA LAVORAZIONE OCCHIALI S.P.A., Padua (IT)

(72) Inventor: Marco Damin, Padua (IT)

(73) Assignee: SAFILO SOCIETÀ AZIONARIA FABBRICA ITALIANA LAVORAZIONE OCCHIALI S.P.A., Padua (IT)

( * ) Notice: Subject to any disclaimer, the term of this patent is extended or adjusted under 35 U.S.C. 154(b) by 250 days.

(21) Appl. No.: 16/315,425

(22) PCT Filed: Jun. 27, 2017

(86) PCT No.: PCT/IB2017/053822
§ 371 (c)(1),
(2) Date: Jan. 4, 2019

(87) PCT Pub. No.: WO2018/007899
PCT Pub. Date: Jan. 11, 2018

(65) Prior Publication Data
US 2019/0310491 A1 Oct. 10, 2019

(30) Foreign Application Priority Data
Jul. 7, 2016 (IT) .................. 102016000070985

(51) Int. Cl.
*G02C 5/04* (2006.01)
*G02C 5/02* (2006.01)

(52) U.S. Cl.
CPC ............... *G02C 5/045* (2013.01); *G02C 5/02* (2013.01); *G02C 2200/06* (2013.01); *G02C 2200/18* (2013.01); *G02C 2200/20* (2013.01)

(58) Field of Classification Search
CPC ..................................................... G02C 5/045
(Continued)

(56) References Cited

U.S. PATENT DOCUMENTS

2005/0280771 A1* 12/2005 DiChiara ............... G02C 5/146
351/111
2016/0124244 A1 5/2016 Marcoiu

FOREIGN PATENT DOCUMENTS

CN 201097005 * 6/2008 ............. G02C 13/00
CN 201097005 Y 8/2008

* cited by examiner

*Primary Examiner* — James C. Jones
(74) *Attorney, Agent, or Firm* — Volpe Koenig

(57) ABSTRACT

A device for attaching parts of a spectacles frame to one another includes a first attachment element connectable to a first component part of the frame to be plugged into a second attachment element connectable to a second component part of the frame. A locking pin is active between the first and the second attachment element, in a removable manner, transverse to the plugging direction, so as to attach the first and the second component parts of the frame to one another. The first attachment element includes a pair of limbs constructed equidirectionally and at a distance from a common base, while the second attachment element includes a seat that can hold the pair of limbs in the axial plugging direction between opposing internal walls of the seat, the seat being intersected transverse to the plugging direction by an opening in which the locking pin is rotatably held.

9 Claims, 5 Drawing Sheets

(58) Field of Classification Search
USPC .......................................................... 351/128
See application file for complete search history.

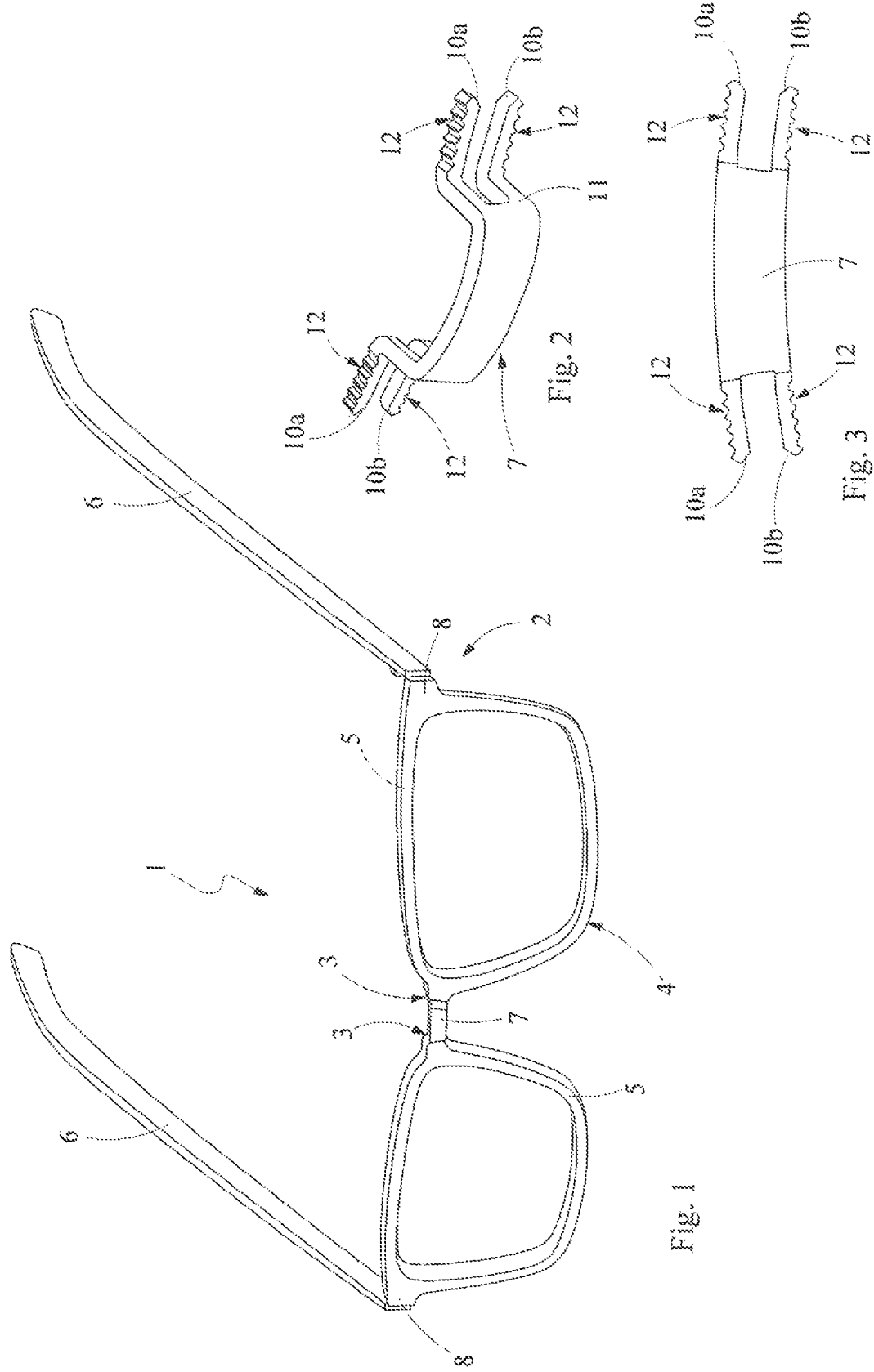

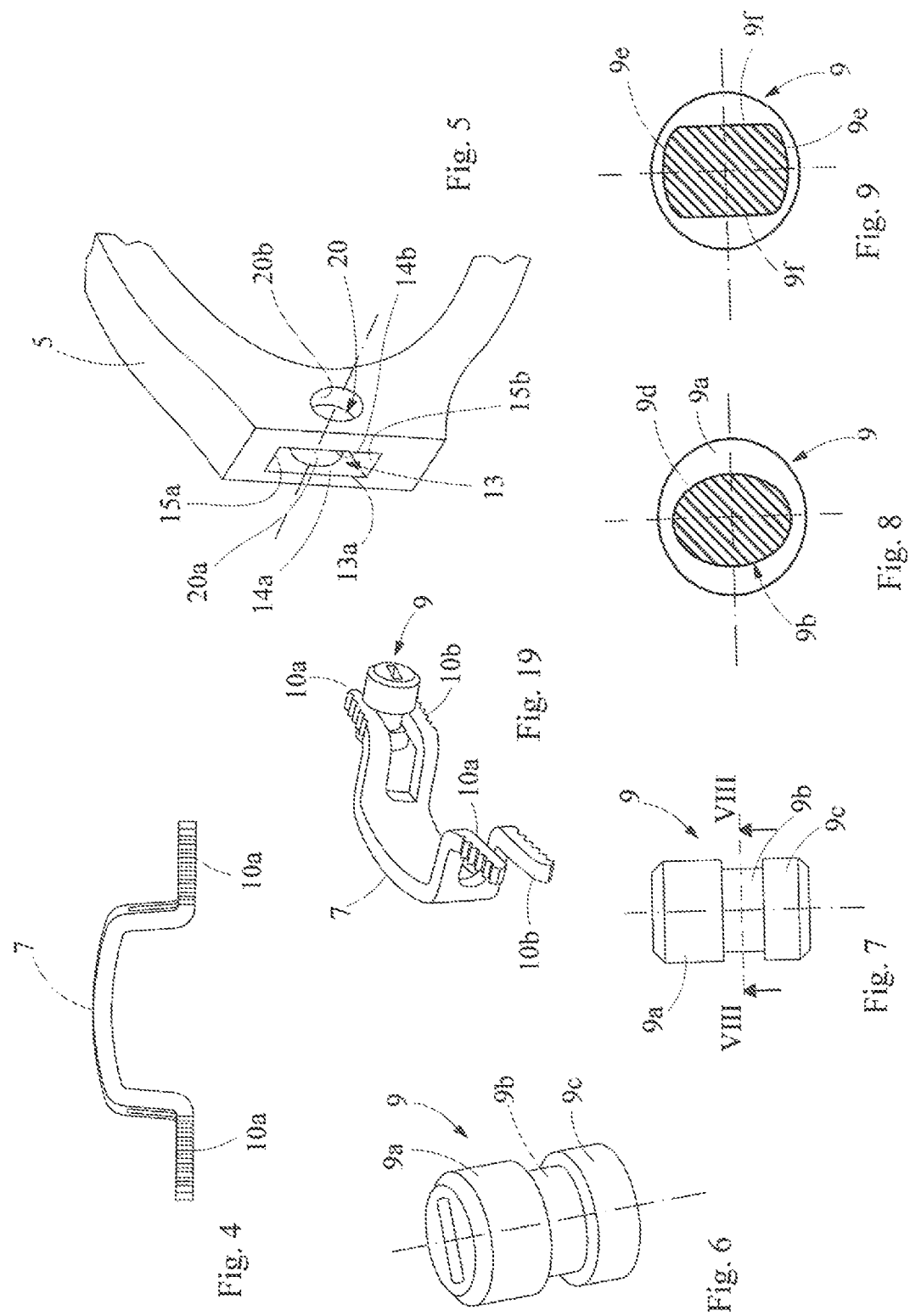

DEVICE FOR ATTACHING COMPONENT PARTS OF SPECTACLES FRAMES AND SPECTACLES COMPRISING SAID ATTACHMENT DEVICE

TECHNICAL FIELD

The present invention relates to a device for attaching component parts of spectacles frames having the features mentioned in the preamble of main claim 1.

The invention is also aimed at spectacles comprising said attachment device produced according to claim 10.

TECHNOLOGICAL BACKGROUND

The invention particularly falls within the domain of spectacles, in which component parts of the frames are assembled by means of mutual attachment means and devices.

The term "component part of a frame" is intended to include, in this context, all identifiable components in a frame, for example the joint lug of the spectacle arms or the nose support bridge extending so as to provide a central connection between the lens-holder rims, or each of the front lens-holder half-frames, or each of the arms or parts thereof, or the hinge joining the arm to the lug. Pairs of these component parts, which are adjacent to one another in the frame, can be connected to one another either permanently or detachably, by suitable attachment means so as to produce the spectacle frame.

DESCRIPTION OF THE INVENTION

A main object of the invention is to provide a device for attaching component parts of spectacle frames to one another that proves effective for simple and rapid fitting together of the frame, but at the same time ensures that the connected parts are suitably held, both in the case of a permanent-attachment system and where reversible attachment is desired. This and other objects that will become clearer below are achieved by a device having the features defined in the attached claims.

BRIEF DESCRIPTION OF THE DRAWINGS

The features and advantages of the invention will be more clearly apparent from the following detailed description of some preferred embodiments thereof, illustrated by way of non-restrictive example, with reference to the attached drawings, in which:

FIG. 1 is a perspective view of a pair of spectacles provided with a device for attaching component parts of a frame produced according to the present invention, FIG. 2 is an enlarged perspective view of a component part of the frame in FIG. 1 for attachment using the device of the invention, FIGS. 3 and 4 are an elevated front view and a plan view of the component in FIG. 2, respectively, FIG. 5 is a partially sectional perspective view of a second component of the frame in FIG. 1 for connection to the component in FIG. 2 by means of the attachment device of the invention, FIG. 6 is a perspective view of a detail of the attachment device of the invention, FIG. 7 is a view in lateral elevation of the detail in FIG. 6, FIG. 8 is a sectional view along the line VIII-VIII in FIG. 7, FIG. 9 is a sectional view corresponding to that in FIG. 8 of a variant embodiment of the detail in FIG. 6, FIG. 19 is another partial perspective view of the device according to the invention.

PREFERRED EMBODIMENTS OF THE INVENTION

Figure 12:
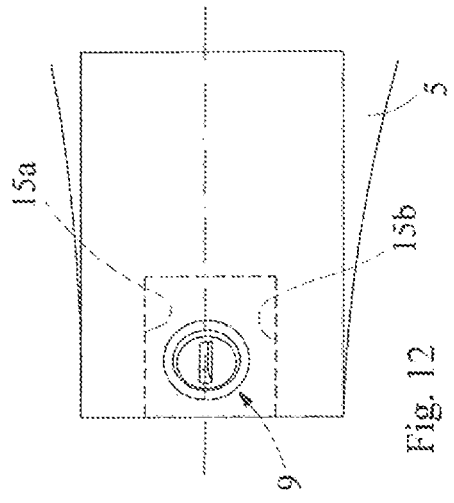
FIGS. 11 to 16 are schematic views of the operating sequence of the steps of attaching the component parts of the frame to one another by means of the device of the invention.

With reference to the cited figures, reference numeral 1 indicates a pair of spectacles as a whole, comprising a frame 2, in which one or more pairs of component parts are attached to one another by an attachment device, which device is indicated by reference numeral 3 as a whole and produced in accordance with the present invention.

The frame 2 comprises a front frame 4 having a pair of lens-holder rims 5 for supporting respective lenses (not shown), a pair of articulated arms 6, and a central bridge 7 providing a central connection between the lens-holder rims.

At each of the opposite lateral ends of the front frame, each arm 6 is hinged with a particular hinge element 8, also known as a "lug" in the specific technical field. The hinge connection can be provided, for example, by means of a hinge pin engaged with eyelets that are made at the corresponding ends of each lug/arm pair that face one another.

The term "component part of a frame" is intended to refer, in this context, to all individual components, for example the front frame (or each half-frame of the particular lens-holder rim), the central connection bridge, each of the arms or parts thereof (for example the arm end), each joint lug, each hinge joining the arms, the present invention relating to the common attachment device 3 for connecting together pairs of such frame components that are positioned next to one another.

A detailed description will be given below of the attachment device 3, designed for attaching the central bridge 7 to each of the lens-holder rims 5 of the front frame 4, it being understood, therefore, that said device 3 can be configured for attaching each pair of "component parts of a frame" to one another in the terms stated above.

With reference to FIG. 2, the central bridge 7 is designed to be attached, at each of its opposite ends, to each particular lens-holder rim 5, a pair of attachment devices therefore being provided, only one of which is described below because of their identical structure and their mirror-image symmetrical location relative to a median plane of symmetry of the bridge 7.

Each device 3 comprises a first attachment element associated with the bridge 7 that can be axially plugged, in a direction shown as X, into a second attachment element associated with the corresponding lens-holder rim 5, and also a locking pin 9, which acts between said first and second attachment element, transversely to the plugging direction X, so as to attach the bridge 7 and the corresponding rim 5 to one another.

More particularly, the first attachment element comprises a pair of limbs 10a, 10b constructed equidirectionally and at a distance from a common base 11 integrated in one end of the bridge 7.

Said limbs 10a, 10b mainly extend in a longitudinal direction so as to take the shape of a pair of elongated arms, which are parallel and at a distance from one another, each of which is formed, starting from its free end, by a first main, perpendicular elongated section, to a second, smaller section, ending at the attachment base 11.

The shape and size of the limbs is chosen such that they are elastically deformable, particularly when they move away from one another, which causes them to diverge.

Each limb 10a, 10b has, along the corresponding first section, a particular surface portion having a serrated profile 12, the function of which will become clear below. The serrated profiles are made on the externally opposite surface portions of the limbs 10a, 10b, as can be seen clearly in FIG. 3.

The second attachment element comprises a seat 13, which is made in the rim 5 in a corresponding position, for holding the pair of limbs 10a, 10b by plugging in the axial plugging direction X. The seat 13 is made in the thickness of the rim 5 in the form of a blind cavity producing a mouth 13a, having a rectangular section, from which two pairs of opposite walls 14a, b and 15a, b extend within the cavity towards a cavity bottom 16.

The limbs 10a, 10b are held in the seat 13 with a small amount of coupling play between the pairs of opposite walls, wherein the serrated surface profile of each limb 10a, 10b faces the corresponding wall 15a, b so as to substantially bearing thereagainst.

The cavity of the seat 13 is also intersected, transversely to the axial plugging direction, by an opening 20, in which the locking pin 9 is rotatably held. Said opening is formed transversely in the thickness of the lens-holder rim 5 and is defined by a pair of coaxial holes 20a, 20b, of the same diameter and made on opposite sides in relation to the cavity, such that both communicate with the inside of said cavity. The hole 20a is formed as a blind hole, while the hole 20b is made as a through-hole and is therefore open to the outside of the lens-holder rim 5 to allow the locking pin to be inserted. Advantageously, the hole 20b is open on the inside of the frame front 4 so that the locking pin 9 remains hidden from view when fitted in the opening 20.

The holes 20a, 20b, suitably being circular in profile, have the same diameter so as to rotatably support the pin 9.

Said pin comprises three portions extending axially so as to be contiguous and coaxial to one another, that is to say a first, cylindrical portion 9a defining the head of the pin, a second, intermediate portion 9b and a third, end portion 9c, which is also cylindrical. The portions 9a and 9c have circular sections of the same diameter, for rotatably coupling to the respective holes 20b, 20a of the opening 20.

The pin portion 9a comprises at its free end a surface suitably shaped to engage with an operating tool so as to set the pin in rotation. Said surface can, for example, be shaped as a slot for screwdrivers, as shown in FIG. 6. The intermediate portion 9b is smaller than each of the portions 9a, 9c, so that the outer contour profile of the cross section of the portion 9b, in axial projection, remains inside the outer circular profile of each of the portions 9a, 9c. Such a shape allows the pin 9 to be inserted into the opening 20 without any interference by the intermediate pin portion 9b, the latter remaining housed inside the cavity of the seat 13.

Said pin portion 9b is also capable of remaining positioned between the pair of limbs 10a, 10b, when said limbs are inserted into the seat 13. The shape of the pin portion 9b is also selected so that said portion 9b remains at a distance from said limbs 10a, 10b when the pin 9 is rotated into a first position, while it interferes with the limbs when the pin is rotated into a second position, so as to resiliently stress the limbs such that they mutually diverge, with each limb against the corresponding wall 15a, 15b of the seat 13, thus bringing about relative locking between the first and the second attachment elements.

To achieve the aforesaid functionality, the intermediate pin portion 9b is suitably designed having a profile that is not axially symmetrical. With reference to FIG. 8, a preferred example provides for the cross section of the intermediate pin portion 9b to have an oval shape, and in particular to be made having an elliptical profile 9d centred on the axis of the pin 9. In a second embodiment shown in FIG. 9, the cross section of the pin portion 9b is shaped as a sector of a circle, particularly as a circular segment having two bases. In the profile of the section, a pair of opposite circular arcs 9e are shown, which are connected to a pair of rectilinear segments 9f defining the bases of the circular segment.

The attachment device functions as follows.

Figure 11:
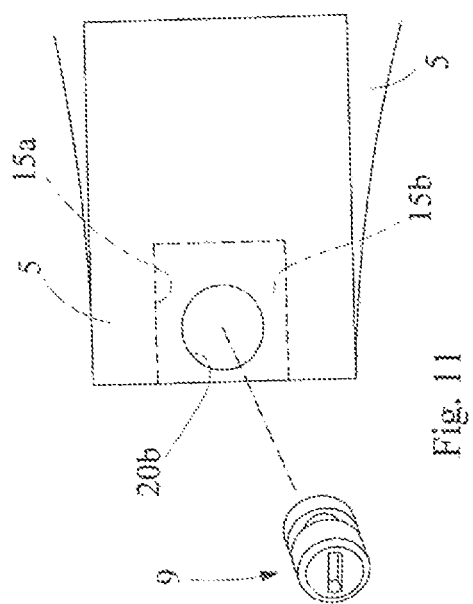
Figure 10:
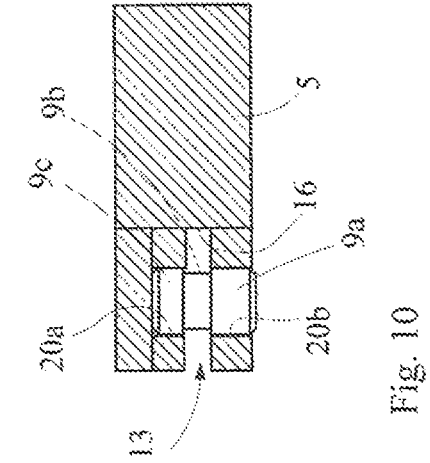
FIG. 10 is a sectional view of the detail in FIG. 5 with the detail in FIG. 6 shown in the fitted state.
Figure 17:
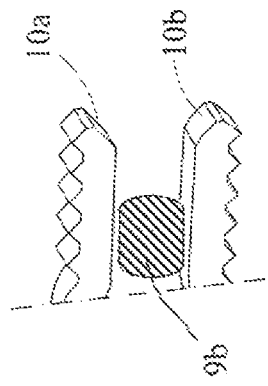
FIG. 17 is a partially schematic view of the device in relation to the attachment step in FIG. 15.

In a first assembly step, the pin 9 is inserted into the opening 20, as shown in FIGS. 10 and 11, causing the pin portions 9a, 9c to be coupled with rotatable engagement in the holes 20b, 20a of the opening 20. In this position, provision is made for the intermediate pin portion 9b to present its smaller transverse dimension (for example the smaller axis of the elliptical profile in FIG. 8, or the distance between the bases of the circular segment, as shown in FIG. 17) between the opposite walls 15a, 15b of the seat, in order to ensure that the limbs can then be plugged into the seat without interference.

Figure 13:
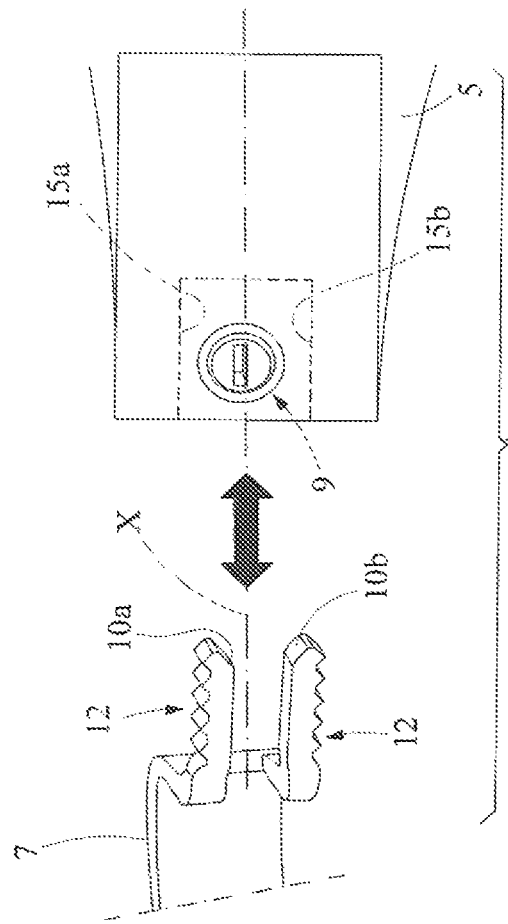

By bringing the bridge 7 towards the particular rim 5 (FIG. 13), the limbs 10a, 10b are slidably inserted, through the mouth 13a, into the seat 13, each limb remaining positioned, with a small amount of coupling play, between the pin portion 9b and the corresponding wall 15a, 15b.

Figure 18:
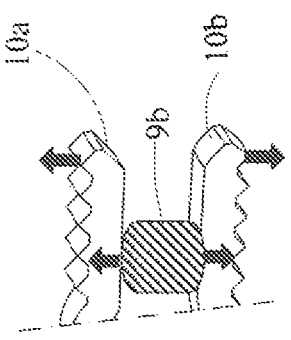
FIG. 18 is a partially schematic view of the device in relation to the attachment step in FIG. 16.
Figure 14:
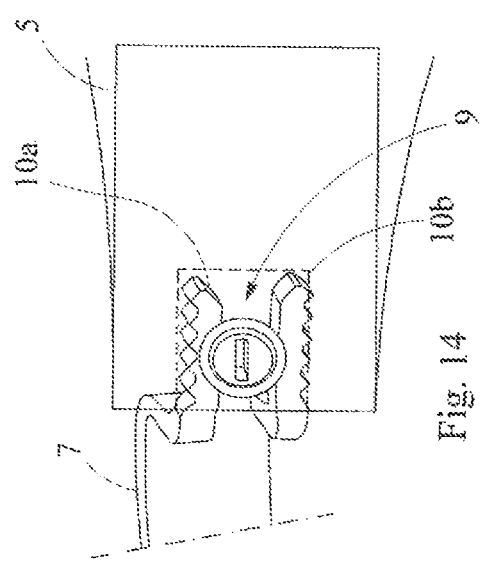
Figure 16:
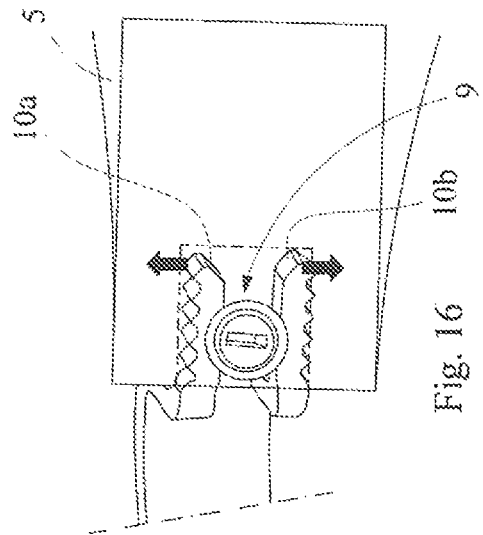
Figure 15:
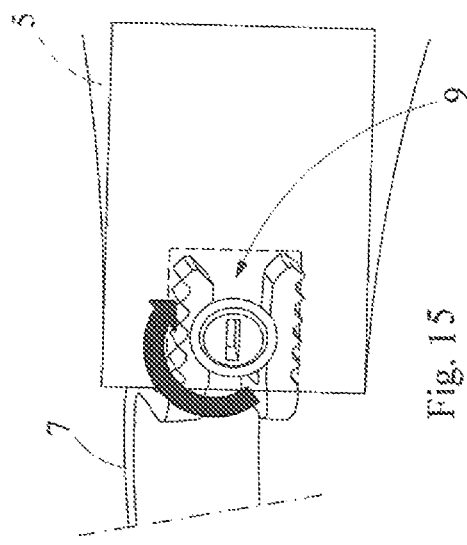

From this position, by rotating the pin 9 by 90° either clockwise or anticlockwise, for example by using a screwdriver engaged in the slot of the head, the intermediate portion 9b is made to interfere with the limbs, interposing between them the intermediate section of the pin having the larger transverse dimension (larger axis of the elliptical profile, or diametral distance between the arcs of the circular-segment profile, as shown in FIG. 18). In this position, the pin 9 causes the limbs 10a, 10b to diverge resiliently, each of said limbs being pressed against the corresponding wall 15a, 15b of the seat, friction-locking the surfaces in contact with one another.

If the serrated profile 12 is provided, the respective serrations brought to press against the surface of the respective walls 15a, 15b improve the surface grip on the walls of the seat.

Locking can be permanent or reversible, this also being dependent on the choice of materials for the components to be connected to the device.

If a bridge 7 made of fairly hard material, for example metal material, is combined with a rim (or half-front) made of softer or more flexible material, for example plastics material, the use of the serrated profiles on each limb 10a, 10b of the bridge 7 lends itself advantageously to a type of substantially permanent locking (since the serrations of the profile impinge upon the plastics for relative grasping).

If the front 4 is also made of a fairly hard material, for example metal, or of a very hard plastics material, reversible locking can be achieved. In that case, it is also possible to avoid using serrated profiles, the locking action being based exclusively on the pressure of the pin on the limbs.

It is understood that, if reversible attachment is produced, the device 3 is unlocked by rotating the pin 9 from the second position to the first, thus cancelling out the thrust of the pin 9 against the limbs 10a, 10b.

It should also be noted that, when said limbs are positioned on the intermediate pin portion 9b, they prevent the pin from coming out of the opening 20 into which it was previously inserted, thanks to the interference between the limbs and the end portion 9c of the pin (FIG. 19). The pin is also prevented from moving laterally, since its end portion 9c is confined to the hole 20a made within the thickness of the rim 5, opposite the pin insertion hole 20b. Therefore, when the limbs 10a, 10b are inserted into the seat, the pin is only able to rotate about its own axis, passing from the first, free position to the second, locked position.

Figure 20:
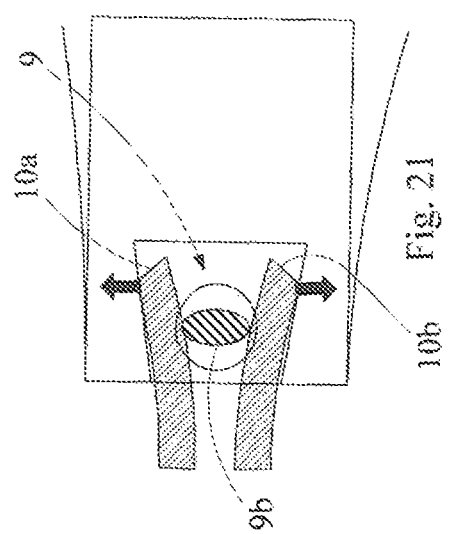
FIGS. 20 and 21 are schematic views of a variant embodiment of the device shown in respective, separate attachment steps.
Figure 21:
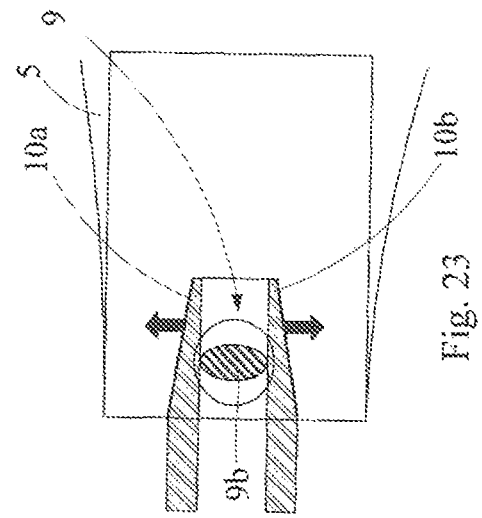

With reference to FIGS. 20 and 21, in which the dimensions of the details depicted have been intentionally accentuated to improve understanding, a variant of the device according to the invention provides for the seat 13 to widen progressively from the mouth 13a towards the bottom 16, achieved in particular by causing the profiles of the opposite walls 15a, 15b to diverge towards the bottom. FIG. 21 schematically shows the locked state, in which the intermediate pin portion 9b (in this case having an elliptical section) presses (causing elastic deformation) the limbs 10a, 10b against the corresponding walls 15a, 15b.

Figure 22:
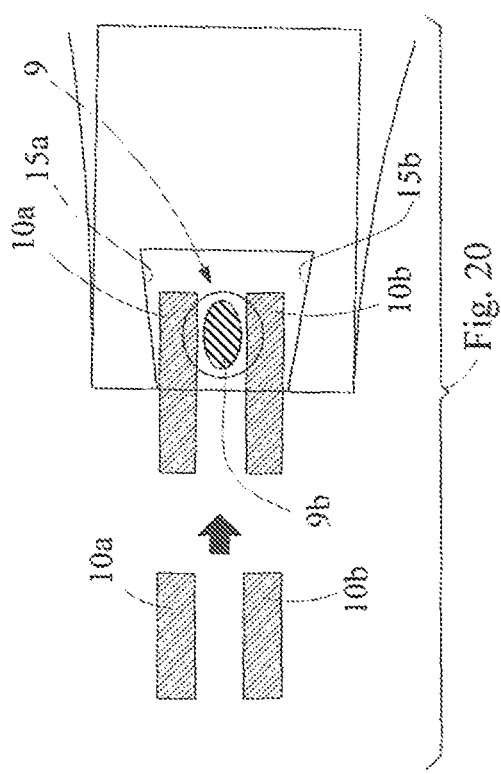
FIGS. 22 and 23 are schematic views of another variant embodiment of the device shown in respective, separate attachment steps.
Figure 23:
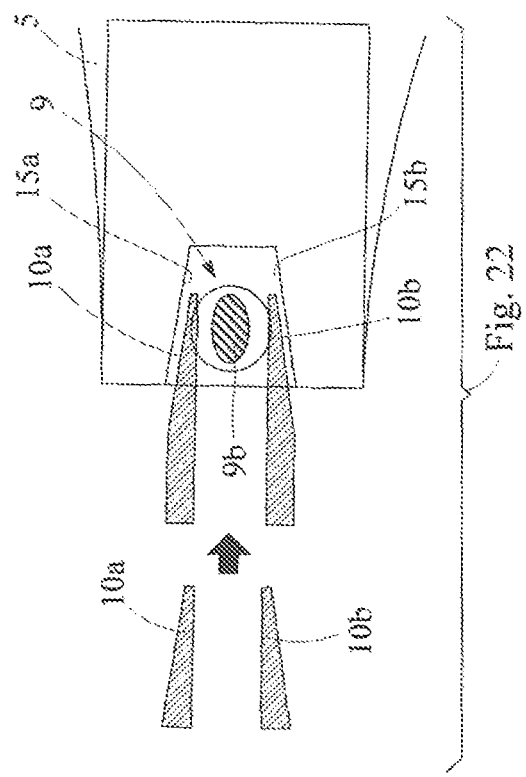

FIGS. 22 and 23 show another variant of the device, which differs from the previous example in that the seat 13 narrows progressively from the mouth towards the bottom 16, achieved by causing the profiles of the opposite walls 15a, 15b to converge towards the bottom. In this case, the limbs 10a, 10b are made to have respective end sections (intended to engage with the seat 13) tapering towards the free end, the taper of each limb having a sloping profile line substantially corresponding to the sloping profile of the respective walls 15a, 15b, as is clearly illustrated in FIG. 22, where the limbs are shown in the non-deformed state. FIG. 23 schematically shows the locked state, in which the intermediate pin portion 9b (having an elliptical section) presses (causing elastic deformation) the limbs 10a, 10b against the corresponding walls 15a, 15b.

As described previously, the connection of the central bridge to the lens-holder rim (or front half-frame) represents an example of a pair of component parts of a frame capable of being attached to one another by means of the device of the invention. Other possible combinations of frame components to which the present invention may be applied are cited below by way of example.

In one combination, the locking limbs are integrated in an upper bridge capable of being attached to the front half-frame, in which frame the seat is provided together with the locking pin. The upper bridge can have a purely aesthetic function in the frame or it can serve as a support for a "sweat guard" element.

In another combination, the locking limbs are arranged in the side lug (hinge support structure) so as to engage with the seat provided in the front half-frame (or the single-piece front frame). The lug is plugged into the half-front (or front) and the arm is articulated to the lug by a hinge.

In another combination, the hinge structure is provided with locking limbs intended to engage with a seat for locking to the front frame (or half-frame) and a seat for locking to the arm. The hinge is then provided either with a plug for the front, on one side, or with a plug for the arm, on the other side. In another combination, the hinge is provided with locking limbs intended to engage with a seat made in the arm. The hinge is then attached in a conventional manner to the front, by means of the lug, and plugs into the arm.

In another combination, the arm is provided with locking limbs intended to engage with a seat made in the hinge structure. The hinge is attached to the lug, on one side, and is provided with a plug for connecting to the arm on the other side.

Another combination provides for the arm to have an arm end, which is separate from the arm body and is provided with locking limbs intended to plug into the locking seat made in the arm body.

The invention thus achieves the objects proposed, achieving the stated advantages over known solutions.

A major advantage lies in the fact that simple, rapid fitting together of component parts of a frame can be achieved with the attachment device of the invention and is applicable to a plurality of possible pairs of frame components that can be attached to one another, and designed for reversible or permanent attachment of said components.

Another advantage lies in the fact that, in the embodiment of the details necessary for producing the attachment device of the invention, the complexity of the processes required and the number of details that have to be prepared are especially low.

The invention claimed is:

1. Device for attaching component parts of a spectacles frame (2) to one another, the device comprising a first attachment element that can be connected to a first component part of the frame and can be plugged into a second attachment element that can be connected to a second component part of the frame, a locking pin (9) being active between said first and second attachment elements, in a removable manner, transverse to a plugging direction (X), so as to attach said first and second component parts of the frame to one another, said first attachment element comprises a pair of limbs (10a, 10b) constructed equidirectionally and at a distance from a common base (11), said second attachment element comprises a seat (13) that can hold said pair of limbs (10a, 10b) in the plugging direction (X) between opposing internal walls (14a, 14b, 15a, 15b) of the seat, said seat (13) is intersected transverse to the plugging direction (X) by an opening (20) in which the locking pin (9) is rotatably held, said opening (20) is defined by a pair of coaxial circular holes (20a, 20b) made in said second component part of the frame, on sides opposite the seat (13), said holes being able to rotatably hold a given pair of axial portions (9a, 9c) of the pin that extend from sides opposite said intermediate portion (9b), at least one of said holes (20a, 20b) being designed as a through-hole for inserting the locking pin (9) into said opening (20), said pin (9) has an intermediate portion (9b) thereof which can remain interposed between said limbs (10a, 10b) when said limbs are inserted into the seat (13), said intermediate pin portion (9b) is designed to remain at a distance from said limbs (10a, 10b), without interfering therewith, when the pin (9) is rotated into a first position, and to interfere with said limbs (10a, 10b) when the pin (9) is rotated into a second position, so as to resiliently stress said limbs such that they mutually diverge, with each limb (10a, 10b) against the corresponding wall of the seat (13), bringing about the relative attachment between said attachment elements.

2. The device according to claim 1, wherein said intermediate pin portion (9b) is formed with an axially asymmetrical profile.

3. The device according to claim 2, wherein a cross section of said intermediate pin portion (9b) is oval.

4. The device according to claim 2, wherein a cross section of said intermediate pin portion (9b) is shaped as a circular sector.

5. The device according to claim 1, wherein a cross section of the intermediate pin portion (9b) has an outer contour profile which, in axial projection, remains inside the outer contour profile of the cross section of each of the pin portions (9a, 9c) opposite the intermediate portion (9b).

6. The device according to claim 1, wherein one (9a) of said pin portions opposite the intermediate portion (9b) comprises at a free end thereof a surface that is designed to engage with an operating tool so as to set the locking pin (9) in rotation between said first and second position.

7. Device for attaching component parts of a spectacles frame (2) to one another, the device comprising a first attachment element that can be connected to a first component part of the frame and can be plugged into a second attachment element that can be connected to a second component part of the frame, a locking pin (9) being active between said first and second attachment elements, in a removable manner, transverse to a plugging direction (X), so as to attach said first and second component parts of the frame to one another, said first attachment element comprises a pair of limbs (10a, 10b) constructed equidirectionally and at a distance from a common base (11), said second attachment element comprises a seat (13) that can hold said pair of limbs (10a, 10b) in the plugging direction (X) between opposing internal walls (14a, 14b, 15a, 15b) of the seat, said seat (13) is intersected transverse to the plugging direction (X) by an opening (20) in which the locking pin (9) is rotatably held, said pin (9) has an intermediate portion (9b) thereof which can remain interposed between said limbs (10a, 10b) when said limbs are inserted into the seat (13), said intermediate pin portion (9b) is designed to remain at a distance from said limbs (10a, 10b), without interfering therewith, when the pin (9) is rotated into a first position, and to interfere with said limbs (10a, 10b) when the pin (9) is rotated into a second position, so as to resiliently stress said limbs such that they mutually diverge, with each limb (10a, 10b) against the corresponding wall of the seat (13), bringing about the relative attachment between said attachment elements, wherein said limbs (10a, 10b) have a main longitudinal extent direction and have respective surface portions configured to face respective walls of the seat once said limbs (10a, 10b) have been inserted into the seat, said surface portions bearing respective serrated profiles (12) for increasing meshing action between the surfaces that are in contact once the locking pin (9) has been moved into the second position.

8. The device according to claim 1, wherein said seat (13) is defined in a cavity provided in said second frame part, said opposing walls (14a, 14b, 15a, 15b) extending from a mouth (13a) of said cavity towards a bottom (16) of the cavity, said walls having profiles that both converge or diverge towards said bottom (16).

9. Glasses comprising a frame (2) that includes a front frame (4) for supporting respective lenses and lateral arms (6) hinged to the front frame (2), and a device for attaching component parts of said frame, produced according to claim 1.

* * * * *